United States Patent [19]
Phillips

[11] 3,929,149
[45] Dec. 30, 1975

[54] BACKFLOW PREVENTOR FOR AUTOMATIC DISHWASHERS

[75] Inventor: Wendell Phillips, Bloomington, Calif.

[73] Assignee: Robert Manufacturing Company, Cucamonga, Calif.

[22] Filed: May 23, 1974

[21] Appl. No.: 472,624

[52] U.S. Cl................................ 137/216; 137/218
[51] Int. Cl.² ........................................ F16K 24/00
[58] Field of Search ..137/216, 218, 533.11, 533.13, 137/533.15

[56] References Cited
UNITED STATES PATENTS

| | | | |
|---|---|---|---|
| 2,324,084 | 7/1943 | Horner | 137/218 |
| 2,737,968 | 3/1956 | Lang | 137/218 |
| 2,941,542 | 6/1960 | Jacobson | 137/218 |
| 3,104,674 | 9/1963 | Bills et al. | 137/218 |
| 3,155,106 | 11/1964 | Baron | 137/216 |
| 3,183,923 | 5/1965 | Henrickson | 137/216 |
| 3,425,438 | 2/1969 | Suffron | 137/216 |
| 3,512,545 | 5/1970 | Weaver | 137/216 |
| 3,648,729 | 3/1972 | Balkany | 137/533.15 X |
| 3,788,342 | 1/1974 | Milette et al. | 137/218 |

Primary Examiner—Henry T. Klinksiek
Attorney, Agent, or Firm—Lyon & Lyon

[57] ABSTRACT

A backflow preventor for installation in the water discharge line between an automatic dishwasher and a garbage disposer, the backflow preventor including an inlet tube for receiving water from the dishwasher, and an outlet tube for discharging water to a garbage disposer or directly to a sewage system, both tubes having upper ends forming the under side of a valve cavity having lateral antisyphon vent ports, and ball check valve retainer and guide means, the ball check valve seating on the upper end of the inlet tube, to prevent backflow to the dishwasher and movable therefrom to permit free discharge of water from the dishwasher through the antisyphon device.

4 Claims, 7 Drawing Figures

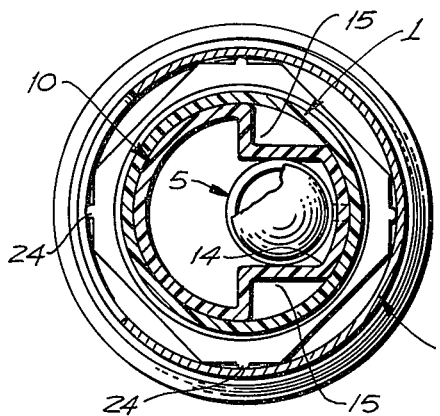
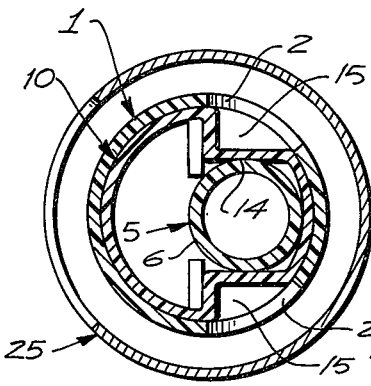
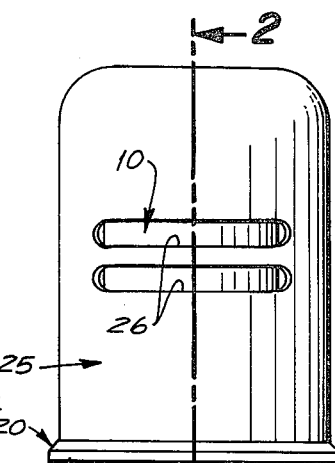
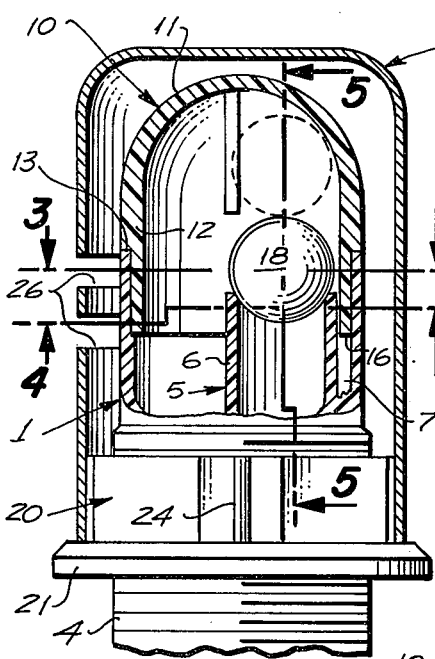
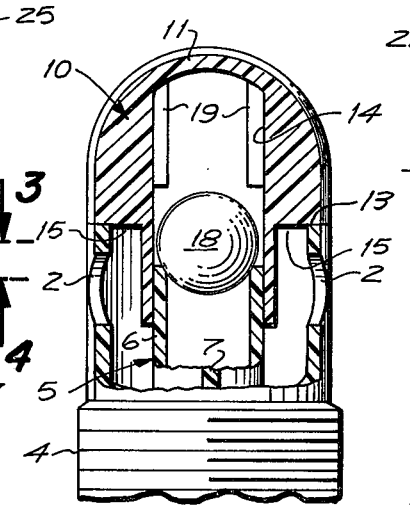
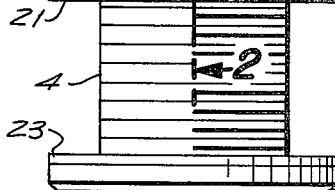
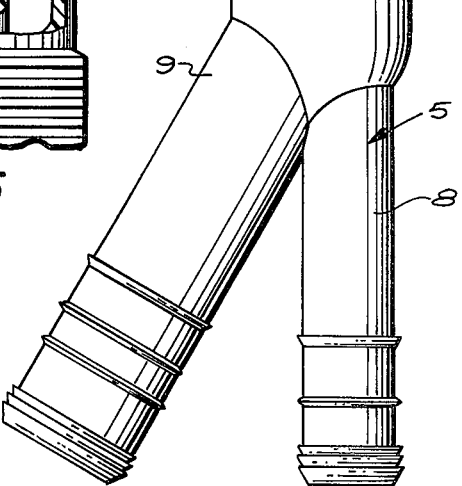
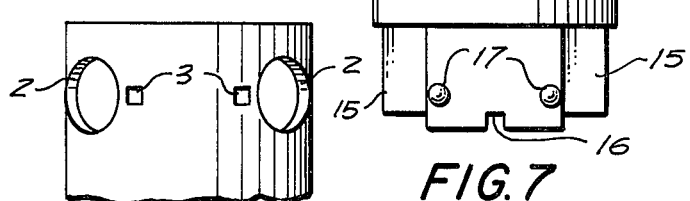

BACKFLOW PREVENTOR FOR AUTOMATIC DISHWASHERS

BACKGROUND OF THE INVENTION

It is a plumbing code requirement in most areas to provide an antisyphon device between an automatic dishwasher and a garbage disposer or a Y-branch connected to a sewage system in order to prevent backflow of contaminated water into the dishwasher. Typical of such antisyphon devices are those disclosed in U.S. Pat. Nos. 3,512,545; 3,425,438; 3,183,923 and 3,155,923. Such antisyphon devices function to permit backflow of air into the inlet duct in the event of the development of a vacuum in the inlet duct. Also the antisyphon devices permit discharge of water resulting from backflow under positive pressure at the garbage disposer; however, in such case particularly if the water is loaded with debris, some water and debris may enter the inlet tube and flow back to the dishwasher. If such backflow coinsides with a vacuum pressure in the water supply to the dishwasher such supply line may become polluted.

SUMMARY OF THE INVENTION

The present invention is directed to an improved backflow preventor and is summarized in the following objects:

First, to provide a backflow preventor primarily intended for installation between an automatic dishwasher and a garbage disposer or a Y-branch connected to a sewage system which is capable of passing the debris laden water from the dishwasher, and incorporates a novelly arranged antisyphon vent and a check valve independently operable to prevent backflow to the dishwasher.

Second, to provide a backflow preventor, as indicated in the preceeding object, wherein a novel chamber includes a guide and retainer means for a ball check valve which enables any debris capable of passage in the line from the dishwasher to pass the check valve for discharge to the garbage disposer or its equivalent.

DESCRIPTION OF THE FIGURES

FIG. 1 is a side view of the backflow preventor.

FIG. 2 is an enlarged fragmentary sectional view thereof taken through 2—2 of FIG. 1, with portions shown in elevation.

FIG. 3 is a transverse sectional view taken through 3—3 of FIG. 2.

FIG. 4 is a transverse sectional view taken through 4—4 of FIG. 2.

FIG. 5 is a fragmentary longitudinal view of the backflow preventor, partially in elevation and partially in section, the sectional view being taken through 5—5 of FIG. 2.

FIG. 6 is a fragmentary side view showing the upper portion of the cylindrical shell.

FIG. 7 is a side view of the cap member.

The backflow preventor includes a tubular, essentially cylindrical shell 1 having near its upper end a pair of vent slots 2 located at one side. A pair of detent receiving perforations 3 are located adjacent the vent slots. Below the vent slots the cylindrical shell is provided with external screw threads 4.

An inlet tube or duct 5 is provided which is integral with the cylindrical shell and inclues an internal upper portion 6 which is eccentrically located with one side adjacent the interior or surface of the shell the upper portion being disposed a plane between the vent slots 2. In the closely confronting region between the shell and internal portion of the tube, the shell and tube are joined by a longitudinal extending web 7, which terminates short of the upper end of the internal portion 6. The inlet tube includes an external portion 8 which protrudes downwardly from the cylindrical shell.

Also extending downward from the shell 1 in angular relation to the external portion 8 of the inlet 2 is an outlet tube or duct 9 which communicates with the region of the shell 1 surrounding the internal portion 6 of the inlet tube 5.

The upper end of the cylindrical shell 1 receives a cap member 10 having a hemispherical end portion 11 joined to a cylindrical portion 12. Externally, the cylindrical portion 12 is slightly smaller than the hemispherical end portion 11 forming a shoulder 13. The cylindrical portion 12 fits slidably within the shell 1, the shoulder 13 engaging the outer extremity of the shell.

The cap member 10 is provided with a guide channel 14 which is directed radially inward and receives the upper end of the internal portion 6 of the inlet tube 5. Formed on opposite sides of the guide channel 14 at the lower portion of the cap member is a pair of vent channels 15.

The wall which forms the radially outer side of the guide channel 14 fits between the internal portion of the inlet tube 5 and the adjacent wall of the shell 1. Its lower end is provided with a notch 16 which is received over the upper end of the web 7 so as to orient the cap member with respect to the shell and to the inlet tube. In order to releasably retain the cap member in place, the wall having the notch 16 is also provided with detents 17 positioned to be received in the detent perforations 3.

The guide channel 14 extends into the end portion 11 of the cap member, that is, it continues above the vent channels 15. The vent channel 15 is dimensioned to receive a ball check valve 18 which engages a valve seat formed at the upper extremity of the internal portion 6 of the inlet tube 5. The ball check valve is preferably formed of rubber or other elastomer. The height of the cap member 10 above the ball is such that the ball may be raised a distance to insure that any material capable of passing through the inlet tube will pass under the ball into the cylindrical shell 1 for discharge through the outlet tube 9, which it will be noted, is larger than the inlet tube 5. In order to retain the ball in a region above the inlet tube 5 the hemispherical portion 11 of the cap member is provided with opposed retainer ribs 19.

The screwthreaded portion of the shell 1 receives an upper clamp nut 20 having a flanged end 21. It also receives a lower clamp nut 22 having a similar flanged end 23. The upper clamp nut 20 is provided with guide means 24 which receives the lower end of a cover member 25 in the form of an inverted cylindrical cup, the axial length of the cup member is such as to permit adjustment of the upper clamp nut 20 while maintaining the closed upper end of the cup clear of the cap member 10. The diameter of the cover member is such as to clear the sides of the cap member 10 and shell 1. The cover member is provided with arcuately extending vent slots 26.

Operation of the backflow preventor is as follows:

The backflow preventor is adapted to be clamped into position at the back side of a kitchen sink provided with a garbage dispenser or Y-Branch which is connected to a sewer system. The outlet tube or duct 9 is adapted to be connected to the garbage dispenser or Y-Branch through a hose or the like, not shown. Similarly, the inlet tube 5 is connected by a hose or the like, now shown, to a dishwasher located at one side of the kitchen sink. Water discharged from the dishwasher flows upwardly through the inlet tube 5 discharging into the chamber formed within the cap 10 and is deflected into the portion of the cap member and shell surrounding the internal portion 6 of the inlet tube for discharge through the outlet tube 9.

While it is customary to provide strainers in a dishwasher to catch large particles washed from the dishes, it is possible that the strainer may be inadvertently removed in which case the water flowing from the dishwasher during the rinsing cycle may contain particles of substantial size. It is essential that any particle capable of entering the inlet tube 5 be discharged into the outlet tube 9, therefor it is desirable that the ball check valve 17 be capable of clearing its valve seat sufficient amount for such particles to pass into the shell 1 for discharge through the outlet tube 9.

During periods between flow of water through the inlet tube the check valve 18 drops by gravity upon its seat. Should a negative pressure develop in the inlet tube, the check valve 18 seals the inlet tube against any backflow, even if the valve should leak, the antisyphon passages formed by the channels 15 and vent slots 2 and 26 prevent any application of vacuum pressure in the outlet tube 9.

It is possible, however, for a positive pressure to develop in the outlet tube 9 causing backflow of contaminated water through the outlet tube 9 into the shell 1 and chamber formed within the cap member 10. While the vent passages are antisyphon passages, and will permit substantial discharge of backflowing water, it is still possible that some of the contaminated water could enter the inlet tube 5 were it not for the presence of the check valve 18.

Having fully described my invention it is to be understood that I am not to be limited to the details herein set forth, but that my invention is of the full scope of the appended claims.

I claim:

1. A back flow preventor comprising:
   a. a tubular shell having a circular open upper end, a vent opening near its upper end, and an internal essentially disposed tube terminating approximately at the upper end of the shell to define with the shell an opening equal to the passage within the internal tube and forming an upwardly directed valve seat, the internal tube and shell forming respectively an inlet duct and an outlet duct;
   b. a cap member having a closed upper end and a tubular lower portion dimensioned for reception into the upper end of the shell around the inner tube whereby the internal tube discharges upwardly into the cap member for downward discharge into the surrounding shell;
   c. said cap member also having an internal valve guide channel aligned with the valve seat and an external channel forming with the shell an upwardly directed vent passage to the vent opening; whereby, in the event of suction pressure within the shell, air may be drawn through the vent opening;
   d. and a ball valve engageable with the internal tube valve seat and movable upwardly therefrom in the guide channel for discharge from the internal tube into the cap member and deflection into the shell.

2. A back flow preventor, as defined in claim 1, wherein:
   a. a pair of vent openings and a pair of vent passages are provided.

3. A back flow preventor, as defined in claim 1, wherein:
   a. the internal tube is joined by a web to the shell, the region of closest proximity;
   b. and the cap member is notched to receive the web thereby to orient the valve guide channel with respect to the ball valve.

4. A back flow preventor, as defined in claim 1, wherein:
   a. separable latch means joins the cap member and shell.

* * * * *